H. Knowles.
Tonguing, Grooving & Moulding Cutters.
No. 6370. Patented Apr. 17. 1849.

UNITED STATES PATENT OFFICE.

HAZARD KNOWLES, OF WASHINGTON, DISTRICT OF COLUMBIA, ASSIGNOR TO JOHN LEVY, OF NEW YORK, N. Y.

CUTTER FOR TONGUING AND GROOVING.

Specification of Letters Patent No. 6,370, dated April 17, 1849.

*To all whom it may concern:*

Be it known that I, HAZARD KNOWLES, of the city and county of Washington and District of Columbia, have invented a new and useful Tonguing, Grooving, and Molding Machine; and I do hereby declare that the following is a full, clear, and exact description thereof, reference being had to the accompanying drawings, whereof—

Figure 2:
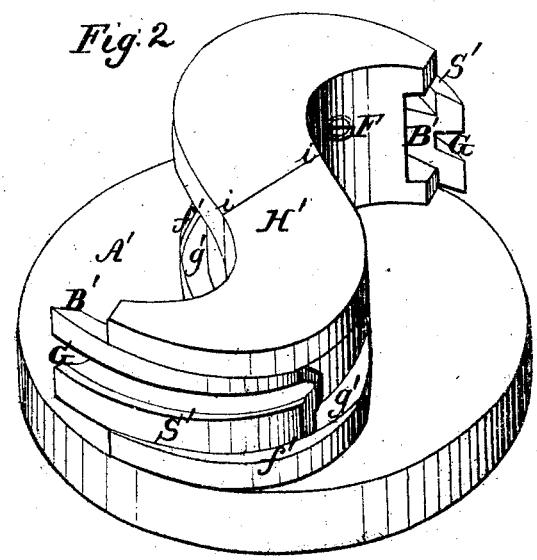
Figure 1:
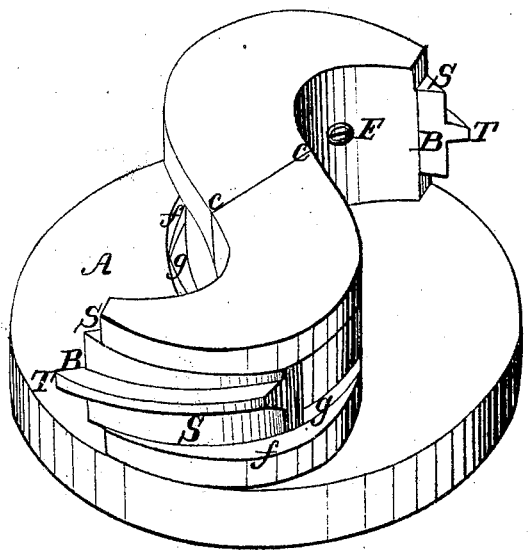

Figure 1 represents a pair of grooving cutters; Fig. 2, a pair of tonguing cutters, and Fig. 3 the arrangement of grooves in a single disk or pair of disks intended to receive three cutters in the same cutter head.

The principal features of my machine refer to, 1, the form and construction of the cutting tools, 2, the manner in which they are arranged, 3, the forming of stocks for their reception, 4, the adjusting and securing of a series of cutters in a common cutter head.

1. I give to my cutters the form of segments of circular rings, the exterior surface of which present in the outlines of their cross sections, figures which are the reverse of the work, whether tongue, groove or molding which they are respectively intended to produce. The cutting edges are formed by grinding an interior bevel (B, Fig. 1, and B′ Fig. 2 and B, B, B, Fig. 3,) quite across the end of the segment. The diameters of the rings of which my cutters are the segments, are considerably less than that of the cutter heads in which they are to be arranged. From the resemblance of the form of curved and internally beveled segments, to the cutting teeth of gnawing animals, I call them rodential cutters. I generally form my cutters by making steel rings which I turn in a lathe so that the interior periphery, edges and exterior periphery near the edges, shall constitute smooth and accurate bearing surfaces, fitted to slide in the circular grooves, in which they are to be held in the stocks or cutter heads. Those parts of the exterior periphery of the ring or segment which are not intended to be held by the grooves of the cutter-stocks are turned in such forms that the outline of their cross section shall be the reverse of that of the work intended to be done. Thus in Fig. 1, the projecting parts T, T, extending beyond the face of the segment of ring S, cut a groove; in Fig. 2 the grooves G, G, turned in the outside of the segment S′ produce a tongue. In some forms of work the part of the segment which slides in the grooves of the cutter head will be ground to an edge and used for cutting, as well as those parts which stand out beyond the groove. This is the case with the part S of the tonguing cutter Fig. 1.

Figure 3:
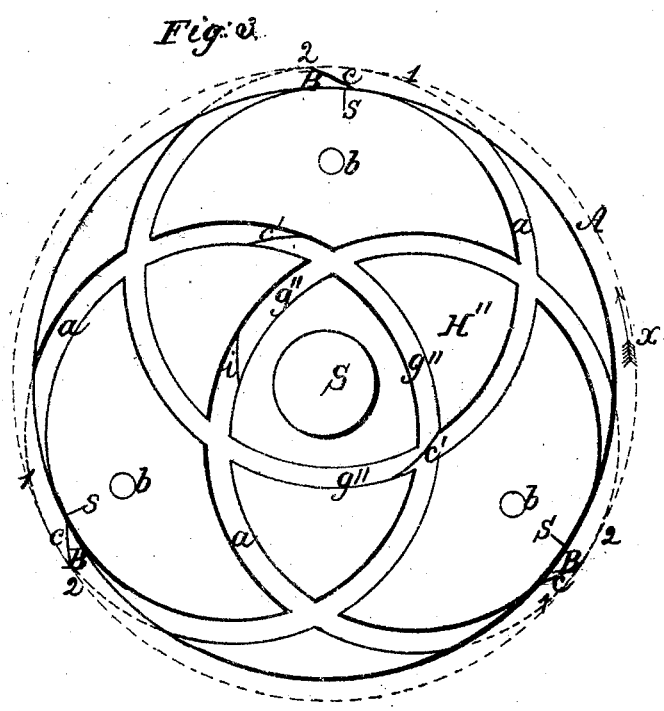

2. The arrangement of the cutters is in a series, of grooves $g$, $g$, Fig. 1, $g'$, $g'$ Fig. 2, or $g''$, $g''$, $g''$, Fig. 3, each groove being a tangent, or nearly so, to the periphery of the cutter head. By this arrangement, as each groove $g''$, $g''$, $g''$, Fig. 3, is, at the part where the cutting edges $c$, $c$, $c$, are placed, nearly coincident with the circle A, (whether the edge $c$ be placed as far back as the point 1, as far forward as 2, or at any intermediate point between them,) the marks $s$, $s$, $s$, on the surface of the disk in which the grooves are cut enable me at once to bring the edge of the cutter to its true position by sliding it in the groove;—but if, through any inattention on the part of the operative who adjusts the cutter, the point $c$ should be set a short distance forward or back of the mark $s$ no perceptible defect in the work will be thereby produced as every cutter in the series will still travel in effect in the same path. Slight inaccuracies of adjustment will thus make no perceptible difference in the operations of the several cutters, arranged on the same stock.

3. The stocks or cutter-heads for giving to the series of segmental cutters their due positions so as to revolve with accuracy and for securing them in those positions, may be constructed either in the manner seen at H, Fig. 1, or H′, Fig. 2, or in that seen at H″ Fig. 3. In both modes of constructing the cutter head, the principle of making the grooves which hold the cutters tangential or nearly so to the periphery of the circle in which the edge of the cutter travels will be preserved. In Figs. 1 and 2, the stocks H and H′ in the exterior peripheries of which the grooves $g$ and $g'$ are cut are attached to the face of the disks A and A′; in Fig. 3, the grooves $g''$ $g''$ $g''$ are turned in the face of the disk H″, and in this modification of the machine another disk exactly matching it has similar eccentrically turned grooves in its face, and the two holding the segments $a$, $a$, $a$, are bolted together by screw-bolts passing through the holes $b$, $b$, $b$. The spindle or axis S, on which the cutter head turns, may pass through both disks, or through one only and may have a long socket to which it is accurately fitted for the purpose of giving steadiness to the cutter head.

4. To adjust and secure the cutters when the modification seen in Figs. 1 and 2 is adopted, the main groove in which the segment slides has side grooves (as seen at $g$ Fig. 1) forming flanges under which the edges of the segments slide, and are held in place by the set-screws E, F. The adjustment of the two extremities S, S, of the holder H, having been duly made, in attaching it to the disk A, the extent to which T shall project beyond S in each cutter, is readily determined by measurement. In the modification seen at Fig. 3, the marks $s$, $s$, $s$, are sufficient guides to the eye and no measurement is required. The arrow $x$ denotes the direction of revolution.

When the work to be done is the production of a plane molding, or the planing of surfaces, the rings are made in the form of hollow cylinders as long as the work is broad, accurately turned both within and without at least near their edges, then divided longitudinally, ground to bevels on the insides of the edges and secured between disks like that seen at Fig. 3, and mounted on an axis either vertical or horizontal as the case may require. Both ends of the cutter, $c$ and $c'$, may be ground to edges, and the position reversed when one becomes dull.

I do not claim the forming of cutters by turning the reverse section of the work, on the periphery of rings or segments of rings, nor do I claim the mere arrangement of a series of cutters in the same cutter-head, these methods being already known, but What I do claim as my invention and desire to secure by Letters Patent is—

Making revolving cutters in the form of segments of circular rings of less diameter than the cutter heads, and arranging and securing them in circular grooves which, at the parts where the cutting edges project, are tangential, or nearly so, to the circles described by the edges of the cutters, in such manner that slight inaccuracies in adjustment will make no perceptible difference in the operation of the cutters and whereby the great loss of time and expenditure of labor, now usually employed in adjusting revolving cutters, for similar purposes, are avoided, substantially as herein set forth.

HAZARD KNOWLES.

Witnesses:
W. R. JOHNSON,
W. J. WHIPPLE.